United States Patent
Saito et al.

(10) Patent No.: US 10,723,825 B2
(45) Date of Patent: Jul. 28, 2020

(54) POWDER COATING MATERIAL, METHOD FOR PRODUCING SUBSTRATE PROVIDED WITH COATING FILM AND COATED ARTICLE

(71) Applicant: AGC Inc., Chiyoda-ku (JP)

(72) Inventors: Shun Saito, Chiyoda-ku (JP); Masataka Aikawa, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 21 days.

(21) Appl. No.: 16/040,040

(22) Filed: Jul. 19, 2018

(65) Prior Publication Data
US 2018/0319918 A1  Nov. 8, 2018

Related U.S. Application Data

(63) Continuation of application No. PCT/JP2017/001804, filed on Jan. 19, 2017.

(30) Foreign Application Priority Data

Jan. 25, 2016 (JP) .................. 2016-011585

(51) Int. Cl.
| | | |
|---|---|---|
| C09D 7/65 | (2018.01) | |
| C09D 5/03 | (2006.01) | |
| B32B 27/20 | (2006.01) | |
| C09D 7/63 | (2018.01) | |
| C09D 7/40 | (2018.01) | |
| C09D 201/04 | (2006.01) | |
| C09D 201/06 | (2006.01) | |
| C09D 7/48 | (2018.01) | |
| C08F 259/08 | (2006.01) | |
| C09D 127/12 | (2006.01) | |
| C09D 151/00 | (2006.01) | |
| C08F 214/18 | (2006.01) | |
| B32B 27/30 | (2006.01) | |
| C08F 214/24 | (2006.01) | |
| C09D 175/04 | (2006.01) | |

(52) U.S. Cl.
CPC .......... *C08F 214/186* (2013.01); *B32B 27/20* (2013.01); *B32B 27/30* (2013.01); *C08F 259/08* (2013.01); *C09D 5/033* (2013.01); *C09D 5/036* (2013.01); *C09D 7/40* (2018.01); *C09D 7/48* (2018.01); *C09D 7/63* (2018.01); *C09D 7/65* (2018.01); *C09D 127/12* (2013.01); *C09D 151/003* (2013.01); *C09D 201/04* (2013.01); *C09D 201/06* (2013.01); *C08F 214/245* (2013.01); *C08L 2201/08* (2013.01); *C08L 2207/53* (2013.01); *C09D 175/04* (2013.01)

(58) Field of Classification Search
None
See application file for complete search history.

(56) References Cited

U.S. PATENT DOCUMENTS

| | | | | |
|---|---|---|---|---|
| 2002/0004557 A1* | 1/2002 | Hart | ........................ | C08G 59/18 525/80 |
| 2004/0077784 A1* | 4/2004 | Ilenda | .................... | C09D 5/037 525/64 |
| 2004/0176554 A1 | 9/2004 | Ishida | | |
| 2004/0266914 A1* | 12/2004 | Yamauchi | ................ | C09D 5/03 523/201 |
| 2015/0072151 A1 | 3/2015 | Saito et al. | | |
| 2016/0222221 A1* | 8/2016 | Saito | ........................ | B32B 27/30 |
| 2016/0355690 A1 | 12/2016 | Saito et al. | | |
| 2016/0362559 A1* | 12/2016 | Saito | ........................ | C09D 5/03 |
| 2017/0038293 A1* | 2/2017 | Saito | ..................... | G01N 17/00 |
| 2017/0321065 A1* | 11/2017 | Ochi | ........................ | C09D 5/03 |

FOREIGN PATENT DOCUMENTS

| | | | |
|---|---|---|---|
| JP | 07304917 A | * | 11/1995 |
| JP | 2003-128994 | | 5/2003 |
| JP | 2009-79252 | | 4/2009 |
| JP | 2013-76019 | | 4/2013 |
| JP | 2013-151608 | | 8/2013 |
| JP | 5419941 | | 2/2014 |
| WO | WO 2014/002964 A1 | | 1/2014 |
| WO | WO 2015/159890 A1 | | 10/2015 |
| WO | WO 2015/190462 A1 | | 12/2015 |
| WO | WO-2016139966 A1 * | 9/2016 | ............... C09D 5/03 |
| WO | WO-2016145135 A1 * | 9/2016 | ............ C09D 127/16 |

OTHER PUBLICATIONS

Machine translation of JP 2013076019 A, retrieved Jan. 2020. (Year: 2020).*
International Search Report dated Feb. 28, 2017 in PCT/JP2017/001804, filed on Jan. 19, 2017 (with English Translation).

* cited by examiner

*Primary Examiner* — Nicole M. Buie-Hatcher
(74) *Attorney, Agent, or Firm* — Oblon, McClelland, Maier & Neustadt, L.L.P.

(57) ABSTRACT

A powder coating material capable of forming a coating film that is excellent in weather resistance, processability and impact resistance and that improves corrosion resistance of a substrate (in particular, a substrate made of aluminum or of an aluminum alloy), wherein the powder coating material contains a powder of a resin composition, wherein the resin composition contains a fluorinated polymer (A) having a number average molecular weight of from 10,000 to 50,000 and a fluorine content of at least 10 mass %, a resin (B) having a fluorine content of less than 10 mass % or containing no fluorine atom, a curing agent, a plasticizer having a melting point of from 50 to 150° C. and core-shell particles, and wherein the absolute value of the difference between the melting point of the plasticizer and the glass transition temperature of a polymer of a shell portion in the core-shell particles is within 30° C. and the content of the plasticizer is from 5 to 25 parts by mass based on 100 parts by mass of the fluorinated polymer (A).

14 Claims, No Drawings

POWDER COATING MATERIAL, METHOD FOR PRODUCING SUBSTRATE PROVIDED WITH COATING FILM AND COATED ARTICLE

This application is a continuation of PCT Application No. PCT/JP2017/001804, filed on Jan. 19, 2017, which is based upon and claims the benefit of priority from Japanese Patent Application No. 2016-011585 filed on Jan. 25, 2016. The contents of those applications are incorporated herein by reference in their entireties.

TECHNICAL FIELD

The present invention relates to a powder coating material, a method for producing a substrate provided with a coating film and a coated article.

BACKGROUND ART

In order to improve corrosion resistance of a substrate made of aluminum or an aluminum alloy (hereinafter also referred to as "an aluminum substrate"), the surface of an aluminum substrate is conventionally subjected to chemical conversion treatment to form a covering film by a chromium chemical conversion treatment agent such as a chromate.

However, from the viewpoint of safety of chromium, it is desirable to carry out chemical conversion treatment by a chemical conversion treatment agent containing no chromium (i.e. non-chromium chemical conversion treatment). Patent Document 1 discloses a non-chromium chemical conversion treatment agent containing zirconium, titanium or vanadium and containing no chromium.

Patent Document 2 discloses an aluminum substrate containing a powder coating material comprising a fluorinated resin, a polyester resin, a pigment and specific core-shell acrylic resin particles and a coating film formed from the powder coating material.

PRIOR ART DOCUMENTS

Patent Documents

Patent Document 1: JP-A-2009-079252
Patent Document 2: JP-A-2013-076019

DISCLOSURE OF INVENTION

Technical Problem

The present inventors have studied an aluminum substrate having on its surface a covering film formed by chemical conversion treatment or anodization treatment as disclosed in Patent Document 1 and Patent Document 2, an aluminum substrate which is further subjected to acid etching treatment or alkali etching treatment before the formation of a covering film and an aluminum substrate provided with a coating film, which is obtained from a powder coating material comprising a known fluororesin, and, as a result, have found that these aluminum substrates do not satisfy standards required these days for weather resistance, processability, impact resistance and corrosion resistance.

The present invention has been made in view of the above-mentioned problem, and it is an object of the present invention to provide a powder coating material capable of forming a coating film that is excellent in weather resistance, processability and impact resistance and that improves corrosion resistance of a substrate (in particular, an aluminum substrate).

Further, it is also an object of the present invention to provide a method for producing an aluminum substrate provided with a coating film by using the powder coating material and a coated article.

Solution to Problem

The present inventors have conducted an extensive study to solve the above problem, and have consequently found that the powder coating material having a specific composition provides desired effects and thus completed the present invention.

That is, embodiments of the present invention are as follows.

[1] A powder coating material comprising a powder of a resin composition, wherein the resin composition comprises the following fluorinated polymer (A), the following resin (B), a curing agent, a plasticizer having a melting point of from 50 to 150° C. and the following core-shell particles, the absolute value of the difference between the melting point of the plasticizer and the glass transition temperature of a polymer of a shell portion in the core-shell particles is within 30° C.; and the content of the plasticizer is from 5 to 25 parts by mass based on 100 parts by mass of the fluorinated polymer (A):

fluorinated polymer (A): a fluorinated polymer having a number average molecular weight of from 10,000 to 50,000 and a fluorine content of at least 10 mass %, resin (B): a fluorinated polymer having a fluorine content of less than 10 mass % or a resin containing no fluorine atom, core-shell particles: particles having a core-shell structure comprising a core portion made of rubber particles and a shell portion made of a polymer having no rubber elasticity, and at least one of the core portion and the shell portion has hydroxy groups.

[2] The powder coating material according to the above [1], wherein the fluorinated polymer (A) is made of a fluorinated polymer having hydroxy groups or carboxy groups and, the resin (B) is made of a polymer having no fluorine atom and having hydroxy groups or carboxy groups.

[3] The powder coating material according to the above [1] or [2], wherein the ratio of the mass average molecular weight to the number average molecular weight (the mass average molecular weight/the number average molecular weight) of the fluorinated polymer (A) is from 1 to 3.5.

[4] The powder coating material according to any one of the above [1] to [3], wherein the resin (B) is a (meth)acrylic resin, a polyester resin, a polyurethane resin, an epoxy resin or a silicone resin.

[5] The powder coating material according to any one of the above [1] to [4], wherein the average particle size of the core-shell particles is from 0.1 to 100 μm.

[6] The powder coating material according to any one of the above [1] to [5], wherein the resin composition further contains a pigment.

[7] A method for producing an aluminum substrate provided with a coating film, which comprises:

applying the powder coating material as defined in any one of the above [1] to [6] to a covering film of a substrate made of aluminum or an aluminum alloy having the covering film formed by treatment with a chemical conversion treatment agent or anodization treatment to form a powder coating material layer; and subjecting the powder coating material layer to heat treatment to form a coating film.

[8] The method for producing a substrate provided with a coating film according to the above [7], wherein the heating temperature for the heat treatment is from 150 to 250° C.

[9] The method for producing a substrate provided with a coating film according to the above [7] or [8], wherein the substrate made of aluminum or an aluminum alloy is subjected to acid etching treatment or alkali etching treatment to form the covering film.

[10] The method for producing a substrate provided with a coating film according to any one of the above [7] to [9], wherein the chemical conversion treatment agent contains no chromium.

[11] The method for producing a substrate provided with a coating film according to the above [10], wherein the chemical conversion treatment agent containing no chromium is a zirconium chemical conversion treatment agent or a titanium chemical conversion treatment agent.

[12] A coated article comprising a substrate and a coating film disposed on the substrate and formed from the powder coating material as defined in any one of the above [1] to [6].

[13] The coated article according to the above [12], wherein the substrate is a substrate made of aluminum or an aluminum alloy.

[14] The coated article according to the above [13] having a covering film formed between the substrate and the coating film by treatment with a chemical conversion treatment agent or anodization treatment.

[15] The coated article according to any one of the above [12] to [14] for use as an exterior material.

Advantageous Effects of Invention

According to the present invention, it is possible to provide a powder coating material capable of forming a coating film that is excellent in weather resistance, processability and impact resistance and that improves corrosion resistance of a substrate (in particular, an aluminum substrate).

Further, according to the present invention, it is possible to provide a method for producing an aluminum substrate provided with a coating film by using the powder coating material and a coated article.

DESCRIPTION OF EMBODIMENTS

Hereinafter, the powder coating material, the method for producing a substrate provided with a coating film and the coated article of the present invention will be described in detail.

In the present specification, a "unit based on a monomer" is a generic term for an atomic group directly formed by polymerization of one monomer molecule and an atomic group obtained by chemical conversion of a part of the atomic group Hereinafter, a "unit based on a monomer" is also referred to just as a "unit".

The number average molecular weight and the mass average molecular weight of a polymer or a resin are values as measured by a gel permeation chromatography using polystyrene as a standard substance. The number average molecular weight may be referred to also as Mn, and the mass average molecular weight may be referred to also as Mw.

The glass transition temperature (hereinafter referred to also as Tg) of a polymer or a resin is a temperature from the inflection point of a chart obtained by measuring the heat balance of the polymer or the resin (10 mg) by using Thermal Analysis System (manufactured by PerkinElmer) under conditions of a temperature range of from −25 to 250° C. and at a temperature-raising rate of 5° C./min. The glass transition temperature may be referred to also as Tg.

A "(meth)acrylate" is a general term for an acrylate and a methacrylate.

The melting point of a plasticizer is a temperature from the melting peak of a chart obtained by measuring the heat balance of the plasticize (10 mg) by using Thermal Analysis System (manufactured by PerkinElmer) under conditions of a temperature range of from −25 to 200° C. and at a temperature-raising rate of 5° C./min.

A technical feature of the powder coating material of the present invention is to adjust the absolute value of the difference between the melting point of the plasticizer and Tg of a polymer of the shell portion in the core-shell particles and the content of the plasticizer.

When the absolute value of the difference between the melting point of the plasticizer and Tg of the polymer of the shell portion is within the predetermined range, the core-shell particles are likely to be dispersed more uniformly in the coating film, which can consequently provide desired effects. When the content of the plasticizer is within the predetermined range, the melt viscosity of the fluorinated polymer (A) having a predetermined range of Mn can be sufficiently lowered, and the core-shell particles are likely to be dispersed more uniformly in the coating film. Therefore, the adhesion of the coating film to the substrate and the processability and the impact resistance of the coating film will be improved. In addition, if these effects are obtained, the corrosion occurring at the interface between the coating film and the substrate will be less likely to occur.

Another feature of the present invention is that Mn of the fluorinated polymer (A) is adjusted to be within a predetermined range (from 10,000 to 50,000).

The present inventors have prepared a powder coating material specifically disclosed in Patent Document 2 and evaluated an aluminum substrate provided with a coating film obtained by such a powder coating material (see Ex.8 in Examples), and as a result have found that further improvement is required for the processability and the impact resistance of the coating film. The present inventors have conducted an extensive study for the cause, and as a result found that the processability and the impact resistance of the coating film are associated with the physical properties of the fluorinated resin and the plasticizer. The present inventors have found that, as shown in Examples as mentioned below, the combination of a fluorinated polymer (A) having a predetermined range of Mn with a specific plasticizer can provide an aluminum substrate provided with a coating film in which the processability and the impact resistance of the coating film are greatly improved.

Hereinafter, the respective components contained in the powder coating material will be described in detail.

Mn of the fluorinated polymer (A) of the present invention is preferably from 10,000 to 30,000. Further, the ratio of Mw to Mn (Mw/Mn) is preferably from 1 to 3.5 from the viewpoint of excellent processability.

The fluorine content of the fluorinated polymer (A) is preferably at least 15 mass %, more preferably at least 20 mass % from the viewpoint of excellent weather resistance. The upper limit is preferably 70 mass %, more preferably 60 mass % from the viewpoint that the powder coating material is excellent in dispersion stability.

The fluorinated polymer (A) preferably has units based on a fluoroolefin, units based on a monomer having a cross-linking group, and units based on a monomer having neither a fluorine atom nor a cross-linking group.

As a monomer having a cross-linking group, a monomer having a cross-linking group capable of reacting with a curing agent is preferred from the viewpoint of excellent coating film properties. Specifically, if the curing agent is a blocked isocyanate curing agent, the monomer having a cross-linking group is preferably a monomer having a hydroxy group, a carboxy group or an amino group, more preferably a monomer having a hydroxy group.

That is, the fluorinated polymer (A) is preferably a fluorinated polymer having cross-liking groups, more preferably a fluorinated polymer having hydroxy groups. The hydroxy value of the fluorinated polymer (A) is preferably from 5 to 100 mgKOH/g, more preferably from 7 to 95 mgKOH/g, particularly preferably from 9 to 90 mgKOH/g. When the hydroxy value of the fluorinated polymer (A) is at least 5 mgKOH/g, a tough coating film is obtained by a crosslinking reaction with the curing agent. When the hydroxy value of the fluorinated polymer (A) is at most 100 mg/g, the flexibility of the coating film and the adhesiveness of the coating film to the substrate become good.

A fluoroolefin is a compound in which one or more hydrogen atoms of an olefin are substituted with a fluorine atom(s).

The carbon number of the fluoroolefin is preferably from 2 to 8, more preferably from 2 to 6.

The number of fluorine atoms in the fluoroolefin is preferably at least 2, more preferably from 3 to 4, from the viewpoint that the coating film is more excellent in weatherability.

In the fluoroolefin, one or more hydrogen atoms not substituted with a fluorine atom(s) may be substituted with a chlorine atom(s).

The fluoroolefin is preferably $CF_2=CF_2$, $CF_2=CFCl$, $CF_2=CFCF_3$, $CH_2=CF_2$ or $CF_2=CHF$, more preferably $CF_2=CF_2$ or $CF_2=CFCl$.

Two or more fluoroolefins may be used.

The content of fluoroolefin units is preferably from 20 to 70 mol %, more preferably from 40 to 60 mol %, particularly preferably from 45 to 55 mol %, based on all units of the fluorinated polymer (A).

The monomer having a cross-liking group is a monomer having no fluorine atom and having a double bond copolymerizable with a fluoroolefin, and is preferably represented by the formula $CH_2=CX^1(CH_2)_{n1}-Q^1-R^1-Y^1$.

In the formula, $X^1$ is a hydrogen atom or a methyl group, n1 is 0 or 1, $Q^1$ is an etheric oxygen atom, —C(O)— or —OC(O)—, $R^1$ is an alkylene group having from 2 to 20 carbon atoms which may contain a ring structure or an etheric oxygen atom, and $Y^1$ is a cross-linking group.

n1 is preferably 0.

$Q^1$ is preferably an etheric oxygen atom.

$R^1$ is preferably a linear alkylene group. The number of carbon atoms in the alkylene group is preferably from 1 to 10, more preferably from 1 to 6, and particularly preferably from 2 to 4.

$X^1$ is preferably a hydrogen atom.

$Y^1$ is preferably a functional group having an active hydrogen (a hydroxy group, a carboxy group, an amino group, etc.), a hydrolyzable silyl group (an alkoxysilyl group, etc.), an epoxy group or an oxetanyl group, more preferably a hydroxy group, a carboxy group or an amino group, and particularly preferably a hydroxy group.

Specific examples of the monomer having a hydroxy group include a hydroxyalkyl vinyl ether, a hydroxyalkyl carboxylic acid vinyl ester, a hydroxyalkyl carboxylic acid allyl ether, a hydroxyalkyl allyl ester, a hydroxyalkyl (meth)acrylate, etc.

Specific examples of the monomer having a carboxy group include an unsaturated carboxylic acid, a saturated polycarboxylic acid monovinyl ester, an unsaturated dicarboxylic acid or its intramolecular acid anhydride, an unsaturated carboxylic acid monoester, etc.

Specific examples of the monomer having an amino group include an aminoalkyl vinyl ether, an aminoalkyl allyl ether, an aminoalkyl carboxylic acid vinyl ester, an aminoalkyl carboxylic acid allyl ester, an aminomethyl styrene, etc.

As the monomer having a cross-linking group, a hydroxyalkyl vinyl ether (such as 2-hydroxyethyl vinyl ether, hydroxymethyl vinyl ether, and 4-hydroxybutyl vinyl ether), a hydroxyalkyl allyl ether (such as 2-hydroxyethyl allyl ether) and a hydroxyalkyl (meth)acrylate (such as 2-hydroxyethyl (meth)acrylate) is preferred. A hydroxyalkyl vinyl ether is more preferred, and 4-hydroxybutyl vinyl ether is particularly preferred, from the viewpoint that the coating film is excellent in copolymerizability and weather resistance.

The content of units based on the monomer having a cross-linking group is preferably from 5 to 40 mol %, more preferably from 8 to 35 mol %, based on all units of the fluorinated polymer (A).

A monomer having neither a fluorine atom nor a cross-linking group is a monomer having a double bond copolymerizable with a fluoroolefin and a monomer having a cross-linking group, and is preferably a monomer represented by the formula $CH_2=CX^2(CH_2)_{n2}-Q^2-R^2$.

In the formula, $X^2$ is a hydrogen atom or a methyl group, $n^2$ is 0 or 1, $Q^2$ is an etheric oxygen atom, —C(O)O— or —OC(O)—, and $R^2$ is an alkyl group having from 2 to 20 carbon atoms which may contain a ring structure or an etheric oxygen atom.

Specific examples of the monomer include an alkyl vinyl ether, an alkyl carboxylic acid vinyl ester, an alkyl allyl ether, an alkyl carboxylic acid allyl ester, an alkyl (meth)acrylate, etc., and an alkyl vinyl ether is preferred. As the alkyl vinyl ether, ethyl vinyl ether, cyclohexyl vinyl ether or 2-ethyl hexyl vinyl ether is preferred.

The content of units based on the monomer is preferably from 0 to 50 mol %, more preferably from 3 to 45 mol %, and particularly preferably from 5 to 40 mol %, based on all units of the fluorinated polymer (A).

The resin (B) of the present invention is a fluorinated polymer having a fluorine content of less than 10 mass % or a resin containing no fluorine atom. The fluorine content of the fluorinated polymer which is the resin (B) is preferably at most 8 mass % and more than 0 mass %.

As the resin (B), a resin containing no fluorine atom is preferred. Among them, a (meth)acrylic resin, a polyester resin, a polyurethane resin, an epoxy resin and a silicone resin are preferred, and a polyester resin is particularly preferred.

The (meth)acrylic resin is a resin made of a polymer having units based on (meth)acrylate as main units.

The (meth)acrylic resin preferably has a carboxy group, a hydroxy group or a sulfo group.

The number average molecular weight of the (meth)acrylic resin is preferably from 5,000 to 100,000, more preferably from 30,000 to 100,000.

The polyester resin is a resin made of a polymer in which units based on a polycarboxylic acid compound and units based on a polyhydric alcohol compound are bound by ester bonds. The polyester resin may be a polyester resin made of a polymer in which units based on a hydroxycarboxylic acid and units based on a ring-opened cyclic ester are bound by ester bonds. The polyester resin may have units other than these units. The polyester resin preferably has at least one of a carboxy group and a hydroxy group at a terminal of the polymer chain.

Specific examples of the polycarboxylic acid compound include phthalic acid, isophthalic acid, terephthalic acid, naphthalene dicarboxylic acid, trimellitic acid, pyromellitic acid, phthalic anhydride, etc. Isophthalic acid is preferred from the viewpoint of more excellent weather resistance.

As the polyalcohol compound, an aliphatic polyalcohol or an alicyclic polyalcohol is preferred, and an aliphatic polyalcohol is more preferred, from the viewpoint that the coating film is excellent in adhesion to the substrate and flexibility.

Specific examples of the polyalcohol compound include ethylene glycol, diethylene glycol, triethylene glycol, 1,2-propanediol, 1,3-propanediol, 1,3-butanediol, 1,4-butanediol, 1,5-pentanediol, neopentyl glycol, spiroglycol, 1,10-decanediol, 1,4-cyclohexane dimethanol, trimethylolethane, trimethylolpropane, glycerin, pentaerythritol, etc.

Specific examples of the hydroxycarboxylic acid include lactic acid, glycolic acid, 4-hydroxybutyric acid, etc. Specific examples of the cyclic ester include γ-butyrolactone, δ-valerolactone, ε-caprolactone, etc.

Mn of the polyester resin is preferably at most 5,000 for the viewpoint that the melting viscosity of the coating film can be appropriately adjusted low.

Specific examples of the polyurethane resin include a resin obtained by reacting a polyol (such as acrylic polyol, polyester polyol, polyether polyol and polypropylene glycol) with an isocyanate compound.

The epoxy resin is a resin having two or more epoxy groups in the molecule. The epoxy resin may further have another reactive group other than the epoxy group.

Specific examples of the epoxy resin include a bisphenol A type epoxy resin and a bisphenol F type epoxy resin.

Specific examples of the silicone resin include a silicone resin such as a silicone made of a dialkyl polysiloxane such as dimethyl polysiloxane, a polyaryl siloxane such as polydiphenyl siloxane, a modified silicone resin such as an amino modified silicone, an epoxy modified silicone, a carboxy modified silicone, an alcohol modified silicone, a polyether modified silicone, etc.

The curing agent in the present invention is preferably a compound having at least two groups reactive with hydroxy groups. Specific examples of the curing agent include a blocked isocyanate curing agent, an amine curing agent (a melamine resin, a guanamine resin, a sulfonamide resin, an urea resins, an aniline resin, etc.), a β-hydroxyalkylamide curing agent, an epoxy curing agent (triglycidyl isocyanurate, etc.), and a blocked isocyanate curing agent is preferred.

The blocked isocyanate curing agent is preferably a solid at 25° C., and is particularly preferably a blocked isocyanate curing agent obtained by first reacting an aliphatic, aromatic or araliphatic diisocyanate with a low molecular compound having active hydrogen to obtain a polyisocyanate and further reacting the polyisocyanate with a blocking agent.

Specific examples of the diisocyanate include tolylene diisocyanate, 4,4'-diphenylmethane isocyanate, xylylene diisocyanate, hexamethylene diisocyanate, 4,4'-methylenebis (cyclohexylisocyanate), methylcyclohexane diisocyanate, bis (isocyanatemethyl) cyclohexane, isophorone diisocyanate, dimer acid diisocyanate, lysine diisocyanate, etc.

Specific examples of the low molecular compound having active hydrogen include water, ethylene glycol, propylene glycol, trimethylolpropane, glycerin, sorbitol, ethylenediamine, ethanolamine, diethanolamine, hexamethylenediamine, isocyanurate, uretdione, a low molecular weight polyester having hydroxy groups, polycaprolactone, etc.

Specific examples of the blocking agent include a alcohol compound (methanol, ethanol, benzyl alcohol, etc.), a phenolic compound (phenol, cresol, etc.), a lactam compound (caprolactam, butyrolactam, etc.), an oxime compound (cyclohexanone, oxime, methyl ethyl keto oxime, etc.), etc.

The melting point of the plasticizer of the present invention is from 50 to 150° C., preferably from 70 to 130° C., more preferably from 90 to 120° C. from the viewpoint that the coating film is more excellent in processability and impact resistance.

The molecular weight of the plasticizer is preferably from 200 to 1,000, more preferably from 220 to 980, particularly preferably from 240 to 960 from the viewpoint that the coating film is more excellent in processability and impact resistance.

The plasticizer has preferably from 1 to 4 ester groups (—C(O)O—), more preferably from 2 to 4 ester groups in one molecule.

The plasticizer preferably further has a cyclic hydrocarbon group. The cyclic hydrocarbon group may be an alicyclic hydrocarbon group or a cyclic aromatic hydrocarbon group.

Specific examples of the plasticizer include dicyclohexyl phthalate (melting point: 68° C., molecular weight: 330), glyceride tribenzoate (melting point: 68° C., molecular weight: 404), pentaerythritol tetrabenzoate (melting point: 108° C., molecular weight: 552), 1,4-cyclohexanedimethanol dibenzoate (melting point: 118° C., molecular weight: 352), and ethylene glycol distearate (melting point: 73.8° C., molecular weight 595).

The core-shell particles of the present invention are particles having a core-shell structure comprising a core portion and a shell portion. The core portion is composed of particles made of rubber (that is, a polymer having rubber elasticity), and the shell portion is composed of a polymer having no rubber elasticity. The shell portion may have a single layer structure or a multilayer structure.

The core-shell particles of the present invention have hydroxy groups. The hydroxy groups of the core-shell particles may be derived from the rubber particles of the core portion, but usually are derived from the polymer of the shell portion constituting the particle surface. That is, the polymer of the shell portion is preferably a polymer having hydroxy groups.

The hydroxy value of the core-shell particles is preferably from 1 to 50 mgKOH/g. When the hydroxy value is at least 1 mgKOH/g, the core-shell particles are less likely to fall off from the coating film, and the adhesion of the coating film to the substrate, the processability of the coating film, and the impact resistance of the coating film tend to be maintained. When the hydroxy value is at most 50 mgKOH/g, the crosslinking density in the coating film tends not to be too high and the coating film is less likely to become brittle.

The average particle size of the core-shell particles is preferably from 0.1 to 100 μm, more preferably from 0.1 to 20 μm, particularly preferably from 0.1 to 5 μm.

The core portion in the core-shell particles is made of rubber particles. Examples of the rubber include an acrylic rubber, a butadiene rubber (BR), a styrene-butadiene rubber (SBR), an isoprene rubber (IR), an ethylene-propylene rubber (EPM), a styrene thermoplastic elastomer (such as a styrene-butadiene-styrene block copolymer, or a styrene-isoprene-styrene block copolymer).

For example, as the acrylic rubber, a copolymer having ethyl acrylate units and units based on a long chain alkyl acrylate (such as butyl acrylate) is preferred. Further, the copolymer having hydroxyalkyl acrylate units is an acrylic rubber having hydroxy groups.

The shell portion of the core-shell particles is made of a polymer having no rubber elasticity, and is preferably made of a polymer having hydroxy groups.

The polymer having hydroxy groups is preferably a copolymer having units based on a monomer having a hydroxy group and units based on a monomer having no hydroxy group. The monomer having a hydroxy group may be a (meth)acrylate having a hydroxy group, an unsaturated alcohol having a hydroxy group, or a vinyl ether having a hydroxy group. The monomer having no hydroxy group may be an alkyl (meth)acrylate, an unsaturated hydrocarbon such as an olefin or styrene, a halogenated olefin or an unsaturated ester such as vinyl acetate.

The polymer having hydroxy groups is preferably a (meth)acrylate polymer having hydroxy groups. As the (meth)acrylate polymer having hydroxy groups, a copolymer of at least one alkyl (meth)acrylate and hydroxyalkyl (meth)acrylate is preferred.

The core-shell particles are usually obtained by polymerizing a monomer which will become a polymer of the shell portion, in an emulsion solution or a suspension containing rubber particles which will become the core portion, and then forming the polymer around the rubber particles to make the shell portion. Commercially available products can be used for the core-shell particles.

Tg of the rubber of the core portion in the core-shell particles is preferably from −70 to 0° C., more preferably from −60 to −20° C. from the viewpoint that the coating film is more excellent in processability and impact resistance.

Tg of the polymer of the shell portion in the core-shell particles is preferably from 50 to 150° C., more preferably from 70 to 130° C., from the viewpoint that the coating film is more excellent in processability and impact resistance.

The absolute value of the difference between the melting point of the plasticizer and Tg of the polymer of the shell portion in the core-shell particles is preferably within 25° C., more preferably within 20° C. The lower limit of the absolute value of the difference is not particularly limited and is 0° C.

The powder coating material of the present invention preferably contains a pigment.

The pigment may be an inorganic pigment or an organic pigment. Specific examples of the pigment include a coloring pigment, an extender pigment, and a luster pigment.

Specific examples of the coloring pigment include an inorganic pigment such as titanium oxide, carbon black, titanium yellow, iron oxide pigment, ultramarine blue, cobalt blue, chromium oxide, spinel green, lead chromate pigment, or cadmium pigment; and an organic pigment such as an azo pigment such as monoazo yellow, a phthalocyanine pigment such as phthalocyanine blue or phthalocyanine green, or a condensed polycyclic pigment such as quinacridone red.

Specific examples of the extender pigment include talc, mica, barium sulfate, clay, and calcium carbonate.

Specific examples of the luster pigment include aluminum powder, nickel powder, gold powder, silver powder, bronze powder, copper powder, stainless steel copper powder, mica (mica), plastic powder, graphite, glass flake, and flaky iron oxide. The glass flake, the mica and the plastic powder may be coated with a metal.

When the powder coating material of the present invention contains a pigment, the content of the pigment is preferably from 20 to 100 parts by mass to 100 parts by mass of the total mass of the fluorinated polymer (A) and the resin (B). Even if the content of the pigment in the powder coating material of the present invention is high, the effects of the present invention are less likely to be impaired, since its dispersibility is high.

The powder coating material of the present invention may contain components other than the above-mentioned components.

Specific examples of other components include a curing catalyst, an ultraviolet absorber (such as various organic ultraviolet absorbers or inorganic ultraviolet absorbers), a light stabilizer (such as a hindered amine light stabilizer), a flatting agent (such as ultrafine synthetic silica), a leveling agent, a surface conditioner (to improve the surface smoothness of the coating film), a degassing agent, a filler, a thermal stabilizer, a thickener, a dispersant, an antistatic agent, a rust preventive agent, a silane coupling agent, an antifouling agent, and a low contamination treatment agent.

The content of the fluorinated polymer (A) in the powder coating material of the present invention is preferably from 1 to 50 mass %, more preferably from 10 to 40 mass %, based on the total mass of the powder coating material.

The content of the resin (B) is preferably from 1 to 50 mass %, more preferably from 10 to 40 mass %, based on the total mass of the powder coating material.

The content of the curing agent is preferably from 1 to 30 mass %, more preferably from 5 to 20 mass %, based on the total mass of the powder coating material.

The content of the plasticizer is preferably from 0.1 to 15 mass %, more preferably from 1 to 10 mass %, based on the total mass of the powder coating material.

The content of the core-shell particles is preferably from 0.1 to 15 mass %, more preferably from 1 to 10 mass %, based on the total mass of the powder coating material.

The content of the plasticizer is from 5 to 25 parts by mass based on 100 parts by mass of the fluorinated polymer (A), and is preferably from 10 to 22 parts, more preferably from 15 to 20 parts by mass, from the viewpoint that the coating film is excellent in impact resistance and processability.

The powder coating material of the present invention is in a powder state.

A method for producing the powder coating material in a powder state may be a method comprising melt-kneading a mixture obtained by mixing respective components to produce a melt-kneaded product and then pulverizing a solid product obtained by cooling the melt-kneaded product to from 0 to 25° C. Further, after pulverizing the solid product, it may be further classified to obtain the powder coating material in a powder state having an arbitrary particle size.

The temperature for melt kneading is preferably from 80 to 140° C.

The average particle size of the powder coating material is preferably from 1 to 100 μm, more preferably from 25 to 75 μm.

Further, the powder coating material of the present invention may have powder components other than the powder of the resin composition of the present invention. For example, it may be a powder coating material comprising the powder of the resin composition containing no pigment and a pigment powder.

The coated article of the present invention comprises a substrate and a coating film disposed on the substrate and formed from the powder coating material of the present invention.

The material of the substrate is an inorganic material, an organic material, an organic-inorganic composite material, etc.

The inorganic material is, for example, concrete, natural stone, glass, metal (such as iron, stainless steel, aluminum, copper, brass, titanium, etc.), etc.

The organic matter is, for example, plastic, rubber, adhesive, wood, etc. The organic-inorganic composite material is, for example, fiber reinforced plastic, resin reinforced concrete, fiber reinforced concrete, etc.

Further, the substrate is preferably subjected to a chemical conversion treatment.

The material of the substrate is preferably a metal, particularly preferably a metal made of aluminum or an aluminum alloy. The aluminum substrate is excellent in corrosion resistance and light in weight, and is suitable for building materials such as exterior materials.

The shape, the size, etc. of the substrate are not particularly limited.

When the aluminum substrate is used as a substrate, the coated article may further have either one of a chemical conversion treated covering film and an anodized covering film between the substrate and the coating film.

The chemical conversion treated covering film is a covering film formed by treatment with a chemical conversion treatment agent. The chemical conversion treated covering film is preferably a chemical conversion treated covering film containing no chromium as described below.

Further, the anodized covering film is a covering film formed by anodization treatment.

The thickness of the coating film formed by using the powder coating material of the present invention is preferably from 20 to 1,000 μm, more preferably from 20 to 500 μm, particularly preferably from 20 to 300 μm.

The method for producing a coated article of the present invention is preferably a method comprising applying the powder coating material of the present invention to the substrate to form a powder coating material layer; and then subjecting the powder coating material layer to heat treatment to form the coating film.

The formation of the powder coating material layer is preferably carried out by, for example, a known coating method such as an electrostatic coating method, an electrostatic spraying method, an electrostatic immersion method, a spraying method, a fluidized immersion method, a spraying method, a thermal spraying method, or a plasma spraying method.

The heat treatment (baking treatment) for the powder coating material layer is preferably carried out by a method of melting the powder coating material layer to a molten state and then cooling the powder coating material layer in a molten state to form the coating film.

The temperature for the heat treatment is usually from 120 to 300° C., preferably from 150 to 250° C. from the viewpoint of sufficiently advancing crosslinking reactions by the curing agent to improve physical properties of the coating film. Further, the heating time (baking time) for the heat treatment is appropriately changed depending on the heating temperature, but is usually from 2 to 60 minutes.

The powdered coating material layer in a molten state is preferably cooled to a room temperature (from 20 to 25° C.). Cooling may be either rapid cooling or slow cooling, and slow cooling is preferred from the viewpoint of adhesion of the substrate of the coating film.

The substrate to be applied for the powder coating material of the present invention is preferably an aluminum substrate. The aluminum substrate means a substrate made of aluminum or an aluminum alloy as mentioned above. That is, a preferred embodiment of the method for producing a coated article of the present invention is the following method for producing an aluminum substrate provided with a coating film:

A method for producing an aluminum substrate provided with a coating film, which comprises: applying the powder coating material of the present invention to a covering film of a substrate made of aluminum or the aluminum alloy having the covering film formed by treatment with a chemical conversion treatment agent or anodization treatment to form a powder coating material layer; and subjecting the powder coating material layer to heat treatment to form the coating film.

In the above producing method, the aluminum substrate provided with a covering film formed by treatment with a chemical conversion treatment agent or anodization treatment is preferably obtained by subjecting the aluminum substrate to either one of acid etching treatment and alkali etching treatment to form the covering film. The etching treatment can remove a natural oxide covering film formed on the aluminum substrate. The aluminum substrate may be subjected to degreasing treatment or water washing treatment before etching treatment.

The acid for acid etching treatment is, for example, hydrochloric acid, sulfuric acid, nitric acid, etc.

The alkali for alkali etching treatment is, for example, caustic soda, caustic potash, sodium metasilicate, sodium carbonate, sodium aluminate, sodium gluconate, etc.

The acid etching treatment is treatment of bringing a solution (particularly an aqueous solution) containing the acid as described above into contact with the aluminum substrate. The etching amount of the acid is preferably from 2 to 8 $g/m^2$.

The alkali etching treatment is treatment of bringing a solution (particularly an aqueous solution) containing the alkali as described above into contact with the aluminum substrate. The etching amount of the alkali is preferably from 1 to 5 $g/m^2$.

The aluminum substrate may be subjected to desmutting treatment or water washing treatment for removing smut generated after the etching treatment.

By subjecting the etched substrate to chemical conversion treatment by a chemical conversion treatment agent or anodization treatment, an aluminum substrate is obtained on which either a chemical conversion treated covering film formed by the chemical conversion treatment or an anodized covering film formed by the anodization treatment is formed.

As the chemical conversion treatment agent, a chemical conversion treatment agent containing no chromium is preferred as described above. Specific examples of the chemical conversion treatment agent containing no chromium include a zirconium chemical conversion treatment agent (a zirconium covering film treatment agent) and a titanium chemical conversion treatment agent (a titanium covering film treatment agent).

As a procedure for treating a substrate using a chemical conversion treating agent, a method of immersing a substrate in a chemical conversion treating agent and a method of applying a chemical conversion treating agent onto a substrate, may be mentioned.

When the zirconium chemical conversion treatment agent is used, the amount of zirconium atoms deposited on the surface of the substrate is preferably from 1 to 200 mg/m$^2$, more preferably from 2 to 150 mg/m$^2$.

When the titanium chemical conversion treatment agent is used, the amount of titanium atoms deposited on the surface of the substrate is preferably from 0.1 to 150 mg/m$^2$, more preferably from 0.5 to 100 mg/m$^2$.

The amount of metal elements deposited on the surface of the substrate can be measured by a fluorescent X-ray analyzer.

The anodization treatment includes an embodiment in which the substrate is immersed in an anodizing bath in the following state.

Free sulfuric acid concentration: from 100 to 200 g/L
Dissolved aluminum concentration: at most 25 g/L
Chloride ion concentration: at most 0.2 g/L
Temperature inside the chamber: from 15 to 25° C.
Current density: 100 A/m$^2$ The thickness (μm) of the anodized covering film can be obtained by the formula of 0.003×current density (A/m$^2$)× electrolysis time (minute).

After the above chemical conversion treatment or anodization treatment, the substrate may be subjected to washing treatment. Further, after the anodic oxidation treatment, hot water treatment may be carried out.

The producing method of the present invention is one in which the powder coating material of the present invention is applied on a covering film disposed on an aluminum substrate provided with a covering film to form a powder coating material layer, and then the powder coating material layer is subjected to heat treatment to form the coating film.

The coating film is preferably formed in a similar way to the method for producing a coated article of the present invention.

EXAMPLES

Hereinafter, the present invention will be described in detail with reference to Examples. However, it should be understood that the present invention is by no means restricted thereto. In the following description, "mass %" for the component proportion is simply referred to also as "%".

Ex. 1 and 2 are Examples of the present invention, and Ex. 3 to 8 are Comparative Examples.

The fluorinated polymers used were produced by the following Production Examples.

Production Example of Fluorinated Polymer 1

Cyclohexyl vinyl ether (CHVE) (51.2 g), 4-hydroxybutyl vinyl ether (HBVE) (13.3 g), xylene (55.8 g), ethanol (15.7 g), potassium carbonate (1.1 g), 50 mass % xylene solution of tert-butyl peroxypivalate (0.7 g) and CF$_2$=CFCl (63.0 g) were introduced to a stainless steel autoclave equipped with a stirrer having an internal volume of 250 mL to obtain a reaction solution. The liquid temperature of the reaction solution was raised to 55° C. and held for 20 hours as it was. Then, the liquid temperature of the reaction solution was raised to 65° C. and held for further 5 hours. Thereafter, the reaction solution was cooled, and the reaction solution was filtered to obtain a filtrate containing a fluorinated polymer 1. The filtrate was vacuum-dried at 65° C. for 24 hours to remove the solvent, and further vacuum-dried at 130° C. for 20 minutes to obtain the fluorinated polymer 1 in a block shape, which was pulverized to obtain the fluorinated polymer 1 in a powder state.

The fluorinated polymer 1 was confirmed to be a fluorinated polymer having 50 mol %, 35 mol %, and 15 mol % of units based on CF$_2$=CFCl, units based on CHVE, and units based on HBVE, respectively, and having Mn of 12,000 (fluorine content: 25 mass %, Mw/Mn: 2.5).

Production Example of Fluorinated Polymer 2

A fluorinated polymer 2 in a powder state was obtained in the same manner as in Production Example of Fluorinated Polymer 1, except that the liquid temperature of the reaction solution was 80° C. and the holding time for the liquid temperature was 24 hours. The fluorinated polymer 2 was confirmed to be a fluorinated polymer having 50 mol %, 35 mol %, and 15 mol % of units based on CF$_2$=CFCl, units based on CHVE, and units based on HBVE, respectively, and having Mn of 9,600 (fluorine content: 25 mass %, Mw/Mn: 6.5).

The following components were used as components other than the fluorinated polymer.

Resin (B) 1: a polyester resin (manufactured by Daicel-Allnex Ltd., CRYLCOAT (registered trademark) 4890-0, number average molecular weight (Mn): 2,500, softening point: 120° C.)

Curing agent 1: a blocked isocyanate curing agent (manufactured by Evonik Industries, Vestagon (registered trademark) B1530)

Plasticizer 1: 1,4-cyclohexanedimethanol dibenzoate (manufactured by VELSICOL, Benzoflex (registered trademark) 352, melting point: 118° C., molecular weight: 352)

Plasticizer 2: dicyclohexyl phthalate (manufactured by Wako Pure Chemical Industries, Ltd., melting point: 68° C., molecular weight: 330)

Plasticizer 3: triphenyl phosphate (manufactured by Johoku Chemicals Co., Ltd., JP-360, melting point: 50° C., molecular weight: 326)

Plasticizer 4: ethylene glycol distearate (manufactured by Nikko Chemicals Co., Ltd., NIKKOL EGDS, melting point: 73.8° C., molecular weight: 595)

Core-shell particles 1: manufactured by Aica Kogyo Co., Ltd., trade name "Staphyloid AC-4030", hydroxy value: 5 mgKOH/g, glass transition temperature of core portion: −40° C., glass transition temperature of shell portion: 100° C., average particle size: 0.5 μm Pigment 1: titanium oxide (manufactured by Du Pont, Ti-Pure (registered trademark) R960, titanium oxide content: 89 mass %)

Degassing agent: benzoin

Surface conditioner 1: manufactured by BYK-Chemie, BYK (registered trademark) −360 P Surface conditioner 2: manufactured by BYK-Chemie, CERAFLOUR (registered trademark) 960, micronized modified amide wax, melting point: 145° C.

Curing catalyst: xylene solution of dibutyltin dilaurate (diluted 10,000 times)

Ultraviolet absorber: manufactured by BASF, Tinuvin (registered trademark) 405, molecular weight: 583.8, melting point: 76.3° C., volatilization temperature: 348.5° C.

Light stabilizer: manufactured by BASF, Tinuvin (registered trademark) 111 FDL

<Evaluation Methods>

(1. Corrosion Resistance)

Cross-cut scratch was made on a coating film of an aluminum substrate provided with the coating film by a cutter so as to reach the aluminum plate. Then, the aluminum substrate provided with the coating film was allowed to stand for 4,000 hours in a salt spray environment. Then, after the aluminum substrate provided with the coating film that had been subjected to the salt spraying treatment was washed by using ion exchanged water, it was dried. Thereafter, the swelling width around the cross-cut scratch in the aluminum substrate provided with the coating film was evaluated according to the following criteria.

⊚: the swelling width around the cross-cut scratch is less than 0.5 mm

○: the swelling width around the cross-cut scratch is at least 0.5 mm and less than 1.0 mm Δ: the swelling width around the cross-cut scratch is at least 1.0 mm and less than 3.0 mm ×: the swelling width around the cross-cut scratch is at least 3.0 mm (2. Processability)

In accordance with JIS K5600-5-1 (bending resistance, cylindrical mandrel method), the processability was evaluated by using the aluminum substrate provided with the coating film.

Specifically, the cracking and peeling of the coating film on the aluminum substrate provided with the coating film were evaluated by using a cylindrical mandrel flexing tester (manufactured by Allgood) and a 2 mm mandrel, according to the following criteria.

○: No cracking or peeling was observed.

Δ: Cracking was slightly confirmed at the end portion.

×: Cracking or peeling was confirmed on the entire surface.

(3. Impact Resistance (Falling Weight Resistance))

In accordance with JIS K5600-5-3 (Du Pont type), impact resistance (falling weight resistance) was evaluated by using the aluminum substrate provided with the coating film.

Specifically, a weight of 500 g was dropped onto the coating film from a height of 70 cm, and the cracking and peeling of the coating film on the aluminum substrate provided with the coating film were evaluated according to the following criteria.

○: No cracking or peeling was observed.

Δ: Cracking was slightly confirmed at the end portion.

×: Cracking or peeling was confirmed on the entire surface.

(4. Weather Resistance)

Cross-cut scratch was made on the coating film of the aluminum substrate provided with the coating film by a cutter so as to reach the aluminum plate. Then, the aluminum substrate provided with the coating film was installed outdoors in Naha City, Okinawa Prefecture. Two years after the installation, the condition of the swelling width around the cross-cut scratch in the aluminum substrate provided with the coating film was evaluated according to the following criteria.

○: the swelling width around the cross-cut scratch is less than 1.0 mm

Δ: the swelling width around the cross-cut scratch is at least 1.0 mm and less than 3.0 mm ×: the swelling width around the cross-cut scratch is at least 3.0 mm <Production of Powder Coating Materials>

[Ex. 1] to [Ex. 8]

The respective components described in Table 1 were mixed for about from 10 to 30 minutes by using a high-speed mixer (manufactured by Yuzaki Co.) to obtain a powdery mixture. Then, the mixture was melt-kneaded at a barrel setting temperature of 120° C. by using a twin-screw extruder (manufactured by Thermoprism Co., 16 mm extruder) to obtain pellets of a powder coating material. Then, the obtained pellets were pulverized at a room temperature by using a pulverizer (manufactured by FRITSCH, product name: Rotor Speed Mill P14) and classified by 150 mesh to obtain a powder having an average particle diameter of about 40 μm.

The amounts of the respective components described in Table 1 are net amounts (parts by mass).

(Surface Treatment of Aluminum Plate)

An aluminum plate (JIS A6063S-T5) having a size of 150 mm×70 mm and a thickness of 2 mm was immersed for 5 minutes in a treatment bath prepared by diluting a treatment agent (manufactured by The Japan Cee-Bee Chemical Co., Ltd., product name "Chemicleaner 514 A") by water (concentration: 30 g/L, temperature: 55° C.), and then the surface of the aluminum plate was subjected to degreasing treatment. Then, the degreased aluminum plate was cleaned for 1 minute by using ion-exchanged water at a room temperature.

Next, the aluminum plate that had been subjected to the degreasing treatment was immersed for 3 minutes in a treatment bath prepared by diluting a treatment solution (manufactured by The Japan Cee-Bee Chemical Co., Ltd., product name "Cee-Bee B-21 dL") by water (concentration: 250 g/L, temperature: 25° C.), and the surface of the aluminum plate was subjected to acid etching treatment. The etching amount was 3.5 g/m². Then, the aluminum plate was washed twice for 1 minute by using ion-exchanged water at a normal temperature.

Next, the aluminum plate that had been subjected to the etching treatment was immersed for 2 minutes in a treatment bath prepared by diluting a chemical conversion treatment agent (manufactured by The Japan Cee-Bee Chemical Co., Ltd., product name: "Chemibonder 5507") by water (concentration: 50 g/L, temperature: 45° C.), and then the aluminum plate was subjected to chromium-free chemical conversion covering film treatment to form a covering film on the aluminum plate. Thereafter, the aluminum plate was cleaned twice for 1 minute by using ion-exchanged water at a room temperature. Then, the aluminum plate was dried in an oven at 70° C. for 5 minutes to prepare the aluminum plate provided with the covering film.

(Production of Aluminum Substrate Provided with Coating Film)

The powder coating material obtained in each of Ex. 1 to Ex. 7 was electrostatically coated on one side of the covering film of the aluminum plate provided with the covering film by using an electrostatic coating machine (manufactured by Onoda Cement Co., Ltd., GX3600C) to obtain an aluminum plate having a powder coating material layer. Then, the aluminum plate was held in an atmosphere at 200° C. for 20 minutes. Next, the aluminum plate was cooled to a room temperature to obtain an aluminum substrate provided with a coating film having a thickness of from 55 to 65 μm, which corresponds to a coated article. Various evaluations as described above were carried out by using the obtained aluminum substrates provided with the coating films as test pieces. The results are shown in Table 1.

In Table 1, the numerical values of the respective components in "Composition of powder coating material" represent parts by mass of the respective components.

TABLE 1

| Production Example | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Composition of powder coating material | Fluorinated polymer 1 | 27.5 | 27.5 | 27.5 | 27.5 | 27.5 | 27.5 | 27.5 | — |
| | Fluorinated polymer 2 | — | — | — | — | — | — | — | 27.5 |
| | Resin (B) 1 | 27.5 | 27.5 | 27.5 | 27.5 | 27.5 | 27.5 | 27.5 | 27.5 |
| | Curing agent 1 | 18 | 18 | 18 | 18 | 18 | 18 | 18 | 18 |
| | Plasticizer 1 | 5 | — | 5 | — | 1 | — | — | 5 |
| | Plasticizer 2 | — | — | — | — | — | 5 | — | — |
| | Plasticizer 3 | — | — | — | — | — | — | 5 | — |
| | Plasticizer 4 | — | 5 | — | — | — | — | — | — |
| | Core-shell particles | 3 | 3 | — | — | 3 | 3 | 3 | 3 |
| | Pigment 1 | 18.4 | 18.4 | 18.4 | 18.4 | 18.4 | 18.4 | 18.4 | 18.4 |
| | Degassing agent | 0.5 | 0.5 | 0.5 | 0.5 | 0.5 | 0.5 | 0.5 | 0.5 |
| | Surface conditioner 1 | 1 | 1 | 1 | 1 | 1 | 1 | 1 | 1 |
| | Surface conditioner 2 | 2 | 2 | 2 | 2 | 2 | 2 | 2 | 2 |
| | Curing catalyst | 0.2 | 0.2 | 0.2 | 0.2 | 0.2 | 0.2 | 0.2 | 0.2 |
| | Ultraviolet absorber | 2 | 2 | 2 | — | 2 | 2 | 2 | 2 |
| | Light stabilizer | 1 | 1 | 1 | — | 1 | 1 | 1 | 1 |
| | Total | 106.1 | 106.1 | 103.1 | 95.1 | 106.1 | 106.1 | 106.1 | 106.1 |
| | Fluorinated polymer/Plasticizer | 100/18.2 | 100/18.2 | 100/18.2 | — | 100/3.6 | 100/18.2 | 100/18.2 | 100/18.2 |
| | Difference between melting point of plasticizer and Tg of shell portion in core-shell particles (absolute value) | 18° C. | 26° C. | — | — | 18° C. | 32° C. | 50° C. | 50° C. |
| Evaluation | Corrosion resistance | ⊚ | ○ | X | X | Δ | Δ | X | ⊚ |
| | Processability | ○ | ○ | X | X | Δ | Δ | X | X |
| | Impact resistance | ○ | ○ | X | X | Δ | Δ | X | Δ |
| | Weather resistance | ○ | ○ | X | X | Δ | Δ | X | ○ |

As shown in Table 1, it was confirmed that desired effects can be provided by using the powder coating materials of the present invention.

On the other hand, no desired effects were provided by Ex. 3 which did not use the core-shell particles, Ex. 4 which did not use the plasticizer and the core-shell particles, Ex. 5 in which the content of the plasticizer was outside the predetermined range, and Ex. 6 and Ex. 7 in which the absolute value of the difference between the melting point of the plasticizer and Tg of the shell portion in the core-shell particles was outside the predetermined range. Further, no desired effects were provided by Ex. 8 in which Mn of the fluorinated polymer was outside of the predetermined range.

What is claimed is:

1. A powder coating material comprising a powder of a resin composition,
wherein the resin composition comprises the following fluorinated polymer (A), the following resin (B), a curing agent, a plasticizer having a melting point of from 50 to 150° C. and the following core-shell particles,
the absolute value of the difference between the melting point of the plasticizer and the glass transition temperature of a polymer of a shell portion in the core-shell particles is within 30° C.; and
the content of the plasticizer is from 5 to 25 parts by mass based on 100 parts by mass of the fluorinated polymer (A):
fluorinated polymer (A): a fluorinated polymer having a number average molecular weight of from 10,000 to 50,000 and a fluorine content of at least 10 mass %,
resin (B): a fluorinated polymer having a fluorine content of less than 10 mass % or a resin containing no fluorine atom,
core-shell particles: particles having a core-shell structure comprising a core portion made of rubber particles and a shell portion made of a polymer having no rubber elasticity, and at least one of the core portion and the shell portion has hydroxy groups.

2. The powder coating material according to claim 1, wherein the fluorinated polymer (A) is made of a fluorinated polymer having hydroxy groups or carboxy groups and, the resin (B) is made of a polymer having no fluorine atom and having hydroxy groups or carboxy groups.

3. The powder coating material according to claim 1, wherein the ratio of the mass average molecular weight to the number average molecular weight (the mass average molecular weight/the number average molecular weight) of the fluorinated polymer (A) is from 1 to 3.5.

4. The powder coating material according to claim 1, wherein the resin (B) is a (meth)acrylic resin, a polyester resin, a polyurethane resin, an epoxy resin or a silicone resin.

5. The powder coating material according to claim 1, wherein the average particle size of the core-shell particles is from 0.1 to 100 µm.

6. The powder coating material according to claim 1, wherein the resin composition further contains a pigment.

7. A method for producing an aluminum substrate provided with a coating film, which comprises:
applying the powder coating material as defined in claim 1 to a covering film of a substrate made of aluminum or an aluminum alloy having the covering film formed by treatment with a chemical conversion treatment agent or anodization treatment to form a powder coating material layer; and subjecting the powder coating material layer to heat treatment to form a coating film.

8. The method for producing a substrate provided with a coating film according to claim 7, wherein the heating temperature for the heat treatment is from 150 to 250° C.

9. The method for producing a substrate provided with a coating film according to claim 7, wherein the substrate made of aluminum or an aluminum alloy is subjected to acid etching treatment or alkali etching treatment to form the covering film.

10. The method for producing a substrate provided with a coating film according to claim 7, wherein the chemical conversion treatment agent contains no chromium.

11. The method for producing a substrate provided with a coating film according to claim 10, wherein the chemical conversion treatment agent containing no chromium is a zirconium chemical conversion treatment agent or a titanium chemical conversion treatment agent.

12. A coated article comprising a substrate and a coating film disposed on the substrate and formed from the powder coating material as defined in claim 1.

13. The coated article according to claim 12, wherein the substrate is a substrate made of aluminum or an aluminum alloy.

14. The coated article according to claim 13 having a covering film formed between the substrate and the coating film by treatment with a chemical conversion treatment agent or anodization treatment.

* * * * *